Aug. 12, 1952 — C. C. HAAS ET AL — 2,606,695
DISPENSING MECHANISM FOR PLANTERS
Filed Aug. 3, 1949 — 3 Sheets-Sheet 1

INVENTORS
CLARENCE C. HAAS
WILLIAM B. BEHNEN
Paul O. Pippel
ATTY.

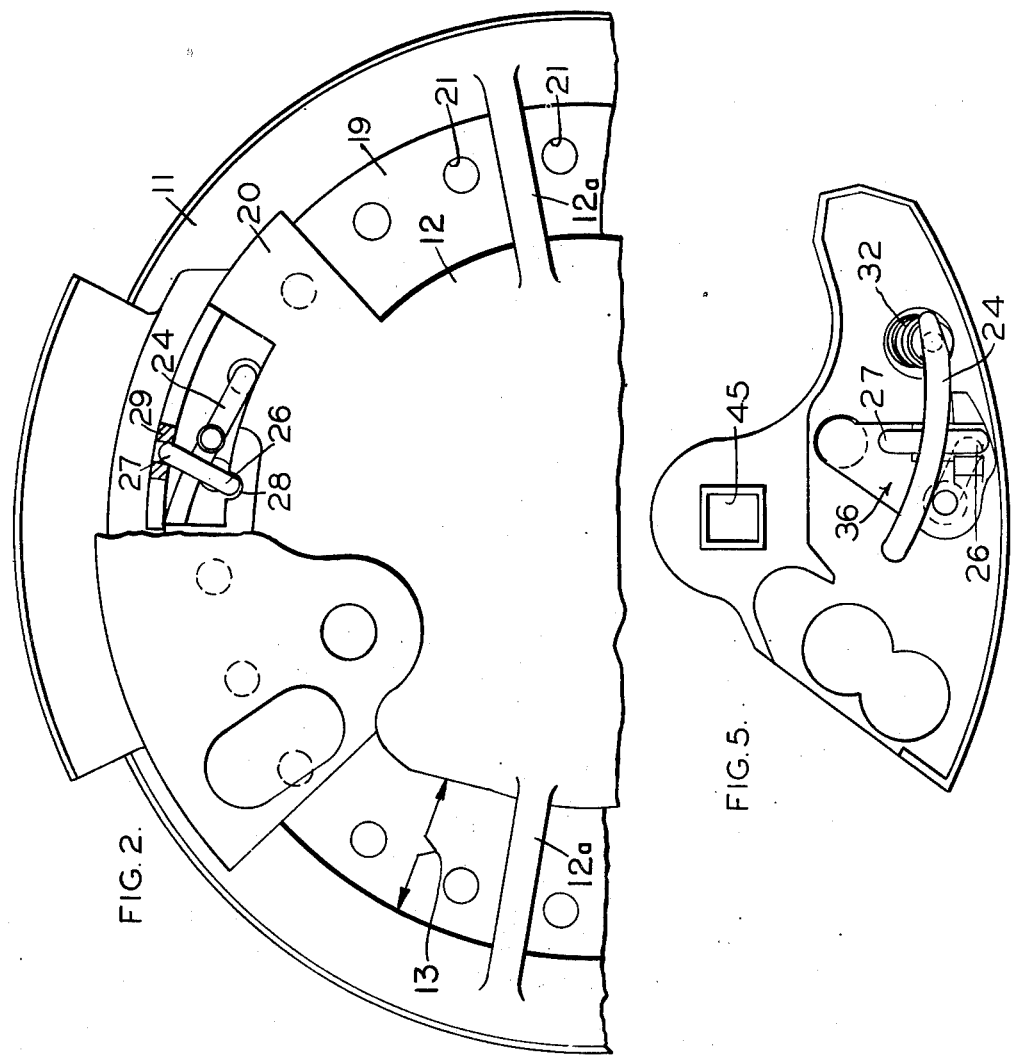

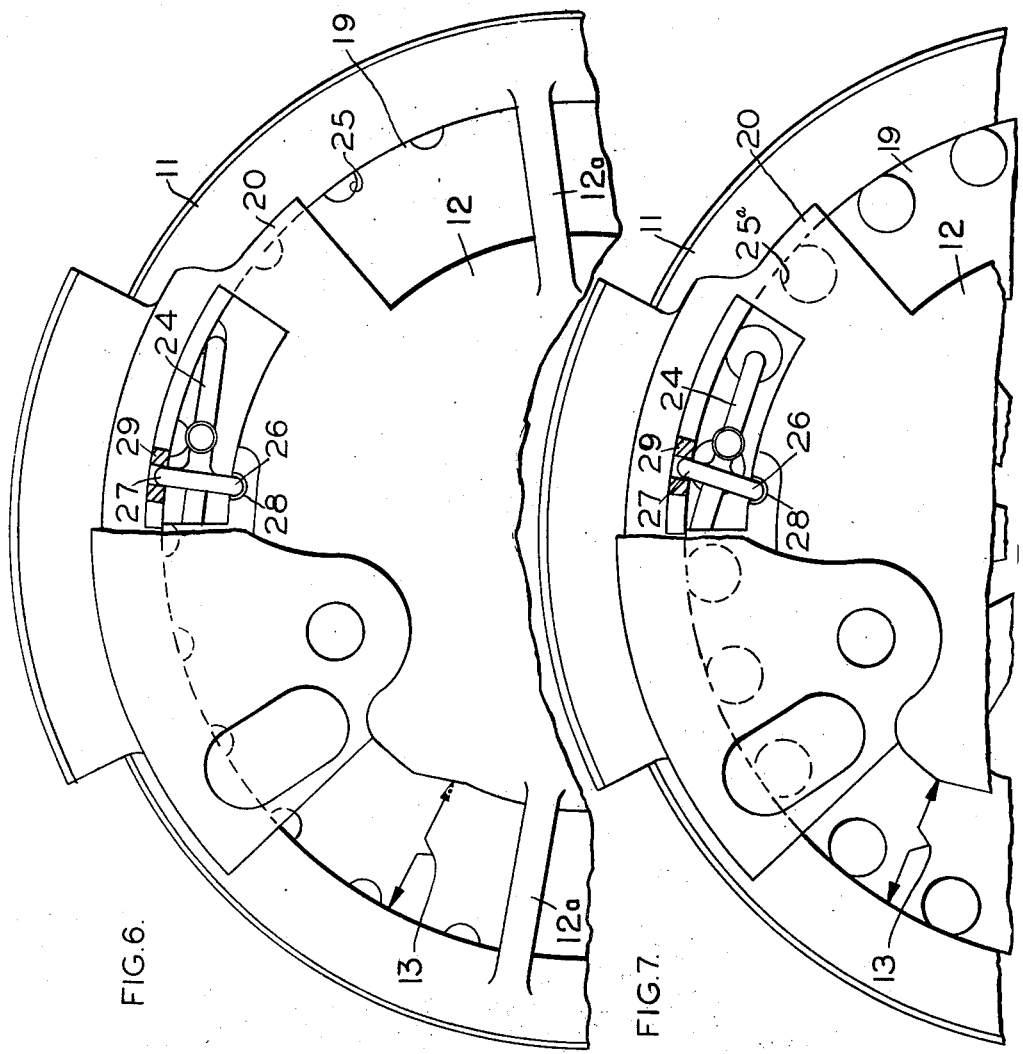

Patented Aug. 12, 1952

2,606,695

UNITED STATES PATENT OFFICE 2,606,695

DISPENSING MECHANISM FOR PLANTERS

Clarence C. Haas and William B. Behnen, Richmond, Ind., assignors to International Harvester Company, a corporation of New Jersey Application August 3, 1949, Serial No. 108,362

3 Claims. (Cl. 222—222)

This invention relates to agricultural implements and particularly to planters. More specifically, the invention concerns an improvement in the type of mechanism for planting corn and the like which includes a hopper having at its base a rotary distributing plate containing seed cells to direct the seed to a discharge opening. Such mechanism also includes a knocker usually carried by a cover plate overlying the seed plate, the function of which is to insure discharge of the seed from the cells.

In planting with the type of mechanism described it is customary to employ different seed plates for different kinds of planting, and a great variety of such plates are available having the cells arranged annularly about the plate spaced at different distances radially of the plate. Some of the plates are provided with notches at the edge of the plate and others have openings spaced radially inwardly from the edge or periphery of the plate.

If the knocker is to properly perform its function it should operate with precision and penetrate vertically into the seed cell to discharge the seed therefrom. It is therefore customary when changing seed plates to also change the cover plate and the knocker so that the latter will be properly positioned relative to the seed plate cells. To avoid the disadvantages inherent in such a procedure it has been proposed to provide seed plate cells having beveled edges and a tilting knocker which, if it did not register with the cell, would tilt and slide into the cell from the edge thereof. Since the importance of precision action of the knocker has already been pointed out, the disadvantages of the above mentioned proposal are obvious.

The present invention was designed to obviate the difficulties referred to and has for one of its objects the provision of an improved planting mechanism of the type described.

Another object of the invention is to provide an improved knocker which may be adjusted to operate accurately with seed plates having differently spaced seed cells.

A further object of the invention is to provide in a seed planting mechanism for use in conjunction with rotary discharge plates, a simple and efficient knocker and adjusting mechanism therefor which provides maximum accuracy in the discharge of seed from different seed plates without replacing the cover plate or the knocker.

Other objects and advantages of the invention will become clear from the following detailed description when read in conjunction with the accompanying drawings, wherein:

Figure 2 is an enlarged plan view partly in section showing a portion of the structure illustrated in Figure 1;

Figure 5 is a detail view from below of the structure shown in Figure 3;

Figure 6 is a plan view similar to Figure 2 showing one position of the knocker for discharging seed from a plate having notches in the edge thereof; and Figure 7 is a view similar to Figure 6 showing the position of the knocker for another plate having seed cells placed farther inwardly from the periphery of the plate.

Figure 1:
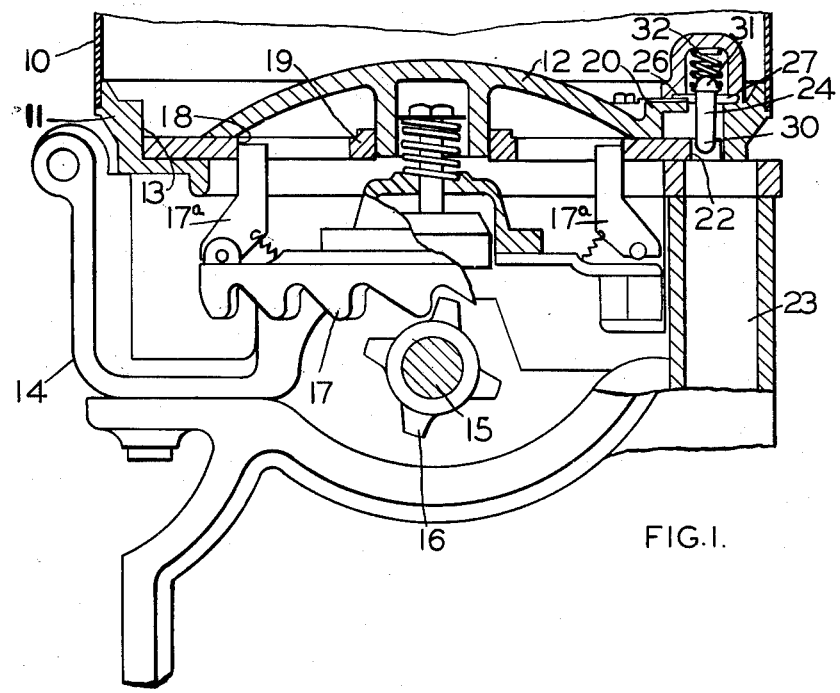
Figure 1 is a vertical sectional elevation of a portion of a planter showing the seed discharge and driving mechanism.

Referring to the drawings, the numeral 10 designates a planter hopper adapted to contain seed to be deposited in the ground and having at its base a plate member 11. Plate member 11 has an arched central portion 12 adapted to feed the seed to the outer edge of the plate where it is dropped through openings 13 spaced from the outer rim thereof, the outer rim and the central portion 12 of the plate 11 being connected at one or more locations by strengthening bridges 12a. The hopper 10 and plate 11 rest upon a support 14 which provides bearings for a horizontally extending shaft 15 having mounted thereupon a toothed wheel 16 which meshes with a gear 17 and causes rotation thereof. Gear 17 is provided with upwardly extending spring-biases projections 17a which extend upwardly into openings 18 provided in a seed plate 19 held in place by the cover plate 11.

As pointed out before, seed, such as grains of corn to be planted, carried by the hopper 10 passes downwardly through the openings 13 provided in the cover plate 11 and rests upon the upper surface of the seed plate 19. Seed plate 19 is rotated in the manner described through the operation of the driven shaft 15, and the grains of corn, for example, are carried thereby to a supporting structure 20 forming a part of the cover plate 11.

The supporting structure 20 forming a part of the cover plate 11 is provided with conventional cut-off mechanism, not shown and forming no part of this invention, the purpose of which is to separate individual kernels of corn from the mass of seed and to insure their proper presentation to the cells of the seed plate. Such mechanism is conventional with planters of the type described and illustrated and insures the entry of the seed into the cells of the plate for delivery to the earth for planting. In Figure 2 a plurality of seed cells 21 are shown arranged peripherally about the seed plate 19 and spaced inwardly from the outer edge thereof. Each of these cells 21 is adapted to receive a grain of corn, for example, and to pass it on to a discharge tube through which the seed passes until it is deposited in the ground. In Figure 1 seed plate 19 is provided with openings in the outer edge thereof for the reception of seed in the form of a plurality of notches 22 arranged about the periphery of the seed plate through which seed is passed to a tube 23 for delivery to the ground at the time of planting.

It is well known that due to the variations in size and shape of kernels of grain such as corn, it is necessary that some means be provided to insure the ejection of the seed from the cell in the seed plate and into the tube 23 for deposit in the ground. For such purposes it is customary to provide a seed knocker which consists of a pivot member supported upon the cover plate supporting structure and provided with a projecting portion which presses into the seed cell and pushes the seed therefrom.

It is customary for farmers in different sections of the country to use a number of types of seed plates so that corn may be planted according to a variety of practices. The manufacturer of seeding equipment therefore manufactures and supplies a number of different kinds of seed plates varying largely in the disposition of the seed cells with respect to the edge or periphery of the seed plate. For example, in Figure 1 is shown a seed plate having the cells in the form of notches indicated at 22 around the periphery thereof. The knocker indicated at 24 is shown extending downwardly into the cell 22. In Figure 2 the seed cells 21 are illustrated as radially inwardly removed from the periphery of the seed plate forming an opening entirely enclosed. Figure 6 illustrates an edge drop plate having notches 25 similar to that shown in Figure 1, and Figure 7 discloses cells 25ª which are spaced inwardly of the periphery and about midway between the cells 25 of Figure 6 and the cells 21 of Figure 2.

It is obvious, of course, that if a farmer is to use a number of different types of seed plates it is necessary for him to make provisions for a knocker to press the seed therefrom. However, it is clear that the knocker 24, which is in line with the cells 22 in Figure 1, would not be in line with the cells 21 of Figure 2. Therefore it is necessary when the farmer changes his seed plate for him also to change the cover plate or at least provide a different knocker.

It was to avoid such disadvantages as those described that applicants have provided the knocker construction and mounting of the present invention. With applicants' knocker construction it is necessary only to change the seed plates and not the knocker. Applicants provide means for adjusting the position of a seed knocker to cause it to register with and to penetrate the seed cells regardless of their position with regard to the edge of the seed plate.

Figure 3:
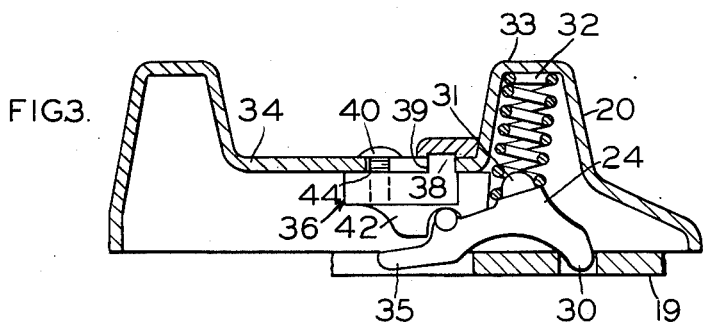
Figure 3 is a sectional elevation showing the knocker mechanism for discharging grain from the seed cells with which the invention is particularly concerned.

The shape of applicants' knocker is well illustrated in Figure 3, and it is shown particularly well in Figure 1 that it is carried upon the supporting portion of the cover plate 11 by a pair of trunnions 26 and 27. As viewed in Figures 2, 6, and 7, trunnion 26 is seated in a depression at 28 formed in the cover plate and serving as a pivot. Trunnion 27 is likewise seated in a depression 29 in the cover plate which likewise serves as a pivot for rocking of the knocker in a generally vertical direction but is in the form of an elongated slot, the purpose of which will hereafter become clear.

In Figure 3 it will be seen that knocker 24 is provided with a knob 30 which projects into the seed cell and another knob 31 extending upwardly and adapted to seat the lower end of a spring 32, the upper end of which presses against an extension 33 of the wall 34 of the housing 20. Spring 32 urges the knocker 24 downwardly so that the knob 30 presses against the seed plate 19 during rotation thereof and is urged into the seed cells in succession. Knocker 24 is likewise provided with a tail portion 35 which is adapted to engage the under surface of the supporting structure of the cover plate to limit the downward movement of the knocker.

In order to adapt the knocker 24 to different seed plates such as are shown in Figures 2, 6, and 7, the knocker is mounted for horizontal swinging movement about the trunnion 26 seated in depression 28 as a pivot. Thus in moving the knocker from the position shown in Figure 2 in registry with seed cells 21 spaced inwardly from the periphery of the knocker to the position shown in Figure 6 with the seed cells in the form of notches 25 in the edge of the seed plate, the knocker may be swung about its pivot so that it will register with the seed cells regardless of their position with respect to the periphery of the seed plate or the radial spacing thereof from the periphery of the plate.

Figure 4:
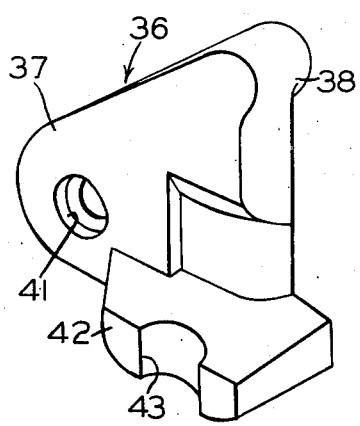
Figure 4 is an enlarged perspective view of the adjusting block for adjusting the position of the knocker shown in Figure 3.

The adjustment of the knocker 24 to register with the different seed cells of different types of seed plates is accomplished with accuracy and the knocker held fixedly in the adjusted position by mechanism shown particularly well in Figures 3, 4, and 5. This adjusting mechanism comprises a block 36 shown in perspective in Figure 4 having a main body portion 37 generally triangular in shape and having at one of its corners a projection 38 adapted to be received in an opening 39 provided in the housing 20 by which the block may be pivoted about a vertical axis. Block 36 is adjustably secured to the housing 20 by means of a bolt 40 received in a threaded opening 41 in the block at a location remote from its pivot 38.

Block 36 is likewise provided with an extension 42 at right angles to the main portion 37 of the block and having formed therein a groove 43 adapted to receive the trunnion 27 of the knocker. Bolt 40 is movable in a slot 44 formed in the housing 20 for the reception of the bolt. Therefore by loosening the bolt 40 the block 36 may be swung about its pivot 38 within the limits of the slot 44. By virtue of the fact that the groove or slot 43 covers and partially encloses the trunnion 27 of the knocker, movement of the block 36 results in a corresponding movement of the knocker about the pivot of trunnion 26 in depression 28. Housing 20 is secured to the cover plate 11 by suitable bolt means receivable in the opening 45 in the housing.

The problem of exchange of one type of seed plate for another in planting mechanism is, as should be clear from the foregoing, made a relatively simple matter involving no extra equipment other than the seed plates themselves. The position of the knocker to cause it to register properly with the seed cells in different seed plates is easily and quickly adjusted and without dismantling the cover plate and the knocker supporting mechanism by simply loosening the bolt 40 and adjusting the position of the block 36 and therefore of the knocker 24 as desired.

The operation of the knocker adjusting structure of the present invention should be clearly understood from the foregoing description. It should likewise be understood that modifications may be made in the construction and arrangement of parts without departing from the spirit of the invention or the scope of the appended claims.

What is claimed is:

1. In seed dispensing mechanism for planters wherein rotatable seed plates are interchangeably provided having seed cells at different locations adjacent the periphery of the plate, a support, a knocker carried by the support, a pair of trunnions carried by the knocker for rockably mounting the latter on a generally horizontal axis, one of said trunnions serving as a pivot for swinging the knocker about a generally vertical axis to adjust the position thereof relative to the seed plate, a locking member pivotally carried by the support, said member being movable about its pivot in a plane parallel to the plane of movement of said knocker and having a portion engageable with the other of said trunnions to impart movement to said knocker about its pivot upon movement of the locking member, and means for adjustably securing said locking member at any location throughout its arc of movement.

2. In seed dispensing mechanism for planters wherein rotatable seed plates are interchangeably provided having seed cells at different locations adjacent the periphery of the plate, a support, a knocker carried by the support, a pair of trunnions carried by the knocker for rockably mounting the latter on a generally horizontal axis, one of said trunnions serving as a pivot for swinging the knocker about a generally vertical axis to adjust the position thereof relative to the seed plate, means for securing the knocker in selected positions throughout its arc of movement about said vertical axis, comprising a member carried by the support and movable through a range corresponding to said arc of movement of the knocker, a groove formed in said member adapted to receive the other of said trunnions to confine the latter and prevent movement of the knocker about said vertical pivot, and means for adjustably securing the member to the support to selected positions, whereby the effective position of the knocker relative to the seed plate may be varied.

3. In seed dispensing mechanism for planters, a rotatable seed plate having seed cells adjacent the periphery thereof, a cover plate, a seed knocker pivotally carried by the cover plate adjacent the periphery of the seed plate for rocking movement on a generally horizontal axis, said knocker being arranged to penetrate the cells in the seed plate to discharge seed therefrom during rotation thereof, a housing for the knocker, an adjustable member within the housing separate from the knocker and movable to selected positions generally radially of the seed plate, means extending to the outside of the housing for adjusting and holding said member in selected positions, and cooperating means between the member and the knocker for moving the latter therewith.

CLARENCE C. HAAS.
WILLIAM B. BEHNEN.

REFERENCES CITED

The following references are of record in the file of this patent:

UNITED STATES PATENTS

| Number | Name | Date |
|---|---|---|
| 650,772 | Avery | May 29, 1900 |
| 1,000,683 | Lindgren | Aug. 15, 1911 |
| 1,044,905 | Nesvant | Nov. 19, 1912 |
| 1,064,842 | Lindgren | June 17, 1913 |